UNITED STATES PATENT OFFICE.

GEORGE WASHINGTON WYNNS, OF UNION, NORTH CAROLINA.

HOG-CHOLERA REMEDY.

SPECIFICATION forming part of Letters Patent No. 289,487, dated December 4, 1883.

Application filed March 26, 1883. (No specimens.)

*To all whom it may concern:*

Be it known that I, GEORGE WASHINGTON WYNNS, a citizen of the United States, residing in the town of Union, in the county of Hertford and State of North Carolina, have invented a new and useful composition and combination of matter to be used in treatment of hog-cholera, of which the following is a specification.

My composition consists of the following ingredients, combined in proportions herein stated, viz: sulphate of iron, three-fourths of a table-spoonful; sulphate of copper, one-fourth of a table-spoonful, and Worthington's cholera medicine, one tea-spoonful. The latter (Worthington's cholera medicine) is composed of equal parts of tinctures of opium, capsicum, camphor, guaiacum, and peppermint. The above constitutes a single dose, given with slop or by drenching, to be repeated at intervals of thirty minutes until the hog is relieved, which will be when vomiting is produced.

What I claim, and desire to secure by Letters Patent, is—

The composition of matter herein described for treatment of hog-cholera, consisting of opium, camphor, guaiacum, capsicum, and peppermint, and sulphate of iron and sulphate of copper, in the proportions set forth.

GEORGE WASHINGTON WYNNS.

Witnesses:
  JAS. P. FREEMAN,
  W. H. SEARS.